(12) United States Patent
Lee et al.

(10) Patent No.: US 12,179,602 B2
(45) Date of Patent: Dec. 31, 2024

(54) MODULAR DRIVING APPARATUS

(71) Applicant: HANKOOK TIRE & TECHNOLOGY CO., LTD., Seongnam-si (KR)

(72) Inventors: Myung Joong Lee, Yongin-si (KR); Ji Eun Yeo, Seoul (KR); Hee Sung Jang, Seoul (KR)

(73) Assignee: HANKOOK TIRE & TECHNOLOGY CO., LTD., Seongnam-si (KR)

( * ) Notice: Subject to any disclaimer, the term of this patent is extended or adjusted under 35 U.S.C. 154(b) by 12 days.

(21) Appl. No.: 18/354,157

(22) Filed: Jul. 18, 2023

(65) Prior Publication Data
US 2023/0356584 A1 Nov. 9, 2023

Related U.S. Application Data

(62) Division of application No. 17/581,221, filed on Jan. 21, 2022, now abandoned.

(30) Foreign Application Priority Data

Jan. 22, 2021 (KR) .................... 10-2021-0009228

(51) Int. Cl.
*B60K 7/00* (2006.01)
*B62D 21/12* (2006.01)
(52) U.S. Cl.
CPC ............ *B60K 7/0007* (2013.01); *B62D 21/12* (2013.01); *B60K 2007/0092* (2013.01)

(58) Field of Classification Search
CPC .......... B60K 7/0007; B60K 2007/0092; B62D 21/12
See application file for complete search history.

(56) References Cited

U.S. PATENT DOCUMENTS

| | | | | |
|---|---|---|---|---|
| 4,570,739 A * | 2/1986 | Kramer | ................ | B62D 61/08 280/DIG. 5 |
| 4,881,756 A * | 11/1989 | Kumasaka | ............ | B62D 65/04 296/193.03 |
| 4,909,525 A * | 3/1990 | Flowers | ................ | B62K 5/025 180/908 |
| 6,170,592 B1* | 1/2001 | Wu | ........................ | B62D 21/12 180/208 |
| 7,849,945 B2* | 12/2010 | Ross, VII | ............ | B60K 7/0007 180/197 |
| 2010/0263954 A1* | 10/2010 | Constans | ................. | B60G 7/02 180/89.12 |

(Continued)

*Primary Examiner* — Erez Gurari
(74) *Attorney, Agent, or Firm* — Bridgeway IP Law Group, PLLC; Jihun Kim

(57) ABSTRACT

Proposed is a modular driving apparatus which is driven in combination with at least one ride module or is driven independently by being combined with or separated from the ride module. The modular driving apparatus includes: a main body including a coupling space in which the ride module is mounted, and wheel modules which surrounds both sides of the ride module mounted in the coupling space and operates to run together with the mounted ride module or operates to run autonomously; and coupling guide blades which are respectively fastened to both sides of the main body and respectively include wheel module coupling holes for exposing the outer surfaces of the wheel modules.

8 Claims, 9 Drawing Sheets

(56) References Cited

U.S. PATENT DOCUMENTS

| | | | | |
|---|---|---|---|---|
| 2013/0206496 A1* | 8/2013 | Hashimoto | ............ | B62D 21/12 |
| | | | | 180/291 |
| 2015/0258868 A1* | 9/2015 | Visscher | ................ | B60G 21/05 |
| | | | | 180/11 |
| 2018/0345971 A1* | 12/2018 | Birnschein | ............ | B62D 21/152 |
| 2019/0232504 A1* | 8/2019 | Radetzki | ................ | B25J 19/005 |
| 2019/0291559 A1* | 9/2019 | Trenne | .................... | B62K 5/05 |
| 2020/0223485 A1* | 7/2020 | Wang | .................... | B62D 21/02 |
| 2020/0398690 A1* | 12/2020 | Lee | ........................ | B60L 53/51 |
| 2021/0108895 A1* | 4/2021 | Howe | .................... | F41H 7/048 |
| 2021/0200213 A1* | 7/2021 | Gillett | .................. | G05D 1/0088 |
| 2022/0017019 A1* | 1/2022 | Subramanian | ........ | B60Q 1/2623 |
| 2022/0135158 A1* | 5/2022 | Lee | ........................ | B60L 53/80 |
| | | | | 180/58 |
| 2022/0234437 A1* | 7/2022 | Lee | .................... | B62D 63/025 |
| 2022/0274650 A1* | 9/2022 | Willison | .............. | B62D 63/025 |
| 2022/0297778 A1* | 9/2022 | Moarefi | ................ | B62D 63/04 |
| 2022/0402116 A1* | 12/2022 | Buchner | ................ | B62D 21/12 |

* cited by examiner

MODULAR DRIVING APPARATUS

CROSS-REFERENCE TO RELATED APPLICATIONS

This application is a divisional application of the U.S. Utility patent application Ser. No. 17/581,221 filed on Jan. 21, 2022, which claims the priority of Korean Patent Application No. 10-2021-0009228 filed on Jan. 22, 2021, in the Korean Intellectual Property Office, the disclosure of which is incorporated herein by reference.

BACKGROUND OF THE INVENTION

Field of the Invention

The present invention relates to a modular driving apparatus and, more specifically, to a modular driving apparatus capable of being driven in combination with an external device or being driven independently.

Background Art

Recently, an electric vehicle industry has been greatly grown in a mobility market.

Since an electric vehicle is designed to have a structure different from the internal combustion engine, many companies tend to develop a basic platform in the form of a skateboard.

The electric vehicle has a high possibility of being optimized for various purposes since lowering the entry barriers in the vehicle design and increasing the degree of freedom in construction of a vehicle interior space.

The conventional electric vehicle has an advantage in that a driving system and an interior space of the electric vehicle can be combined with each other in various ways since the interior space and the driving system can be separated from each other due to various attempts of enterprises. However, it is not easy to adjust the size of the driving system according to various internal spaces of electric vehicles.

Therefore, there is a need for the development of a driving system applicable to various types and sizes of internal spaces.

SUMMARY OF THE INVENTION

Accordingly, the present invention has been made to solve the above-mentioned problems occurring in the prior arts, and it is an object of the present invention to provide a modular driving apparatus which is capable of being easily combined with and separated from a ride module, namely, a pod, according to various sizes.

The technical problem to be solved by the present invention is not limited to the technical problem as mentioned above, and another technical problem, which is not mentioned, could be clearly understood by those having ordinary skill in the art to which the present invention pertains based on the description below.

To accomplish the above object, according to the present invention, there is provided a modular driving apparatus which is driven in combination with at least one ride module or is driven independently by being combined with or separated from the ride module, the modular driving apparatus including: a main body including a coupling space in which the ride module is mounted, and wheel modules which surrounds both sides of the ride module mounted in the coupling space and operates to run together with the mounted ride module or operates to run autonomously; and coupling guide blades which are respectively fastened to both sides of the main body and respectively include wheel module coupling holes for exposing the outer surfaces of the wheel modules.

In an embodiment of the present invention, the coupling guide blade further includes a combination determining sensor which determines combinability with the ride module by sensing the position of the driving apparatus with respect to the ride module while the ride module is mounted in the coupling space.

In an embodiment of the present invention, the combination determining sensor is a lidar sensor.

In an embodiment of the present invention, the combination determining sensor determines combinability with the ride module by sensing whether a portion of the coupling guide blade is positioned at a predetermined reference position with respect to the ride module.

In an embodiment of the present invention, the modular driving apparatus is combined with the ride module or another modular driving apparatus of the outside, or is simultaneously combined with the ride module and another modular driving apparatus of the outside.

In an embodiment of the present invention, the main body further includes: a first coupling unit formed on a first side, which is an area different from both sides in which the wheel modules are respectively located, and inserted into another modular driving apparatus of the outside so as to be combined with the another modular driving apparatus of the outside; and a second coupling unit formed on a second side, which is an area different from both sides in which the wheel modules are respectively located, and into which a coupling unit of another modular driving apparatus of the outside is inserted so that the main body is combined with the another modular driving apparatus of the outside.

In an embodiment of the present invention, the main body further includes a connector module formed on the upper surface providing the coupling space in which the ride module is mounted for combination with the ride module.

In an embodiment of the present invention, the wheel module is formed of an in-wheel motor type including at least one of a driving motor, a brake device, and a shock-absorbing device therein.

According to an embodiment of the present invention, the modular driving apparatus is capable of being easily combined with and separated from a ride module, namely, a pod, according to various sizes.

The effect of the present invention is not limited to the above effects, and it is to be understood that the effects of the present invention include all effects that are inferred from the features of the invention as set forth in the description or the claims.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
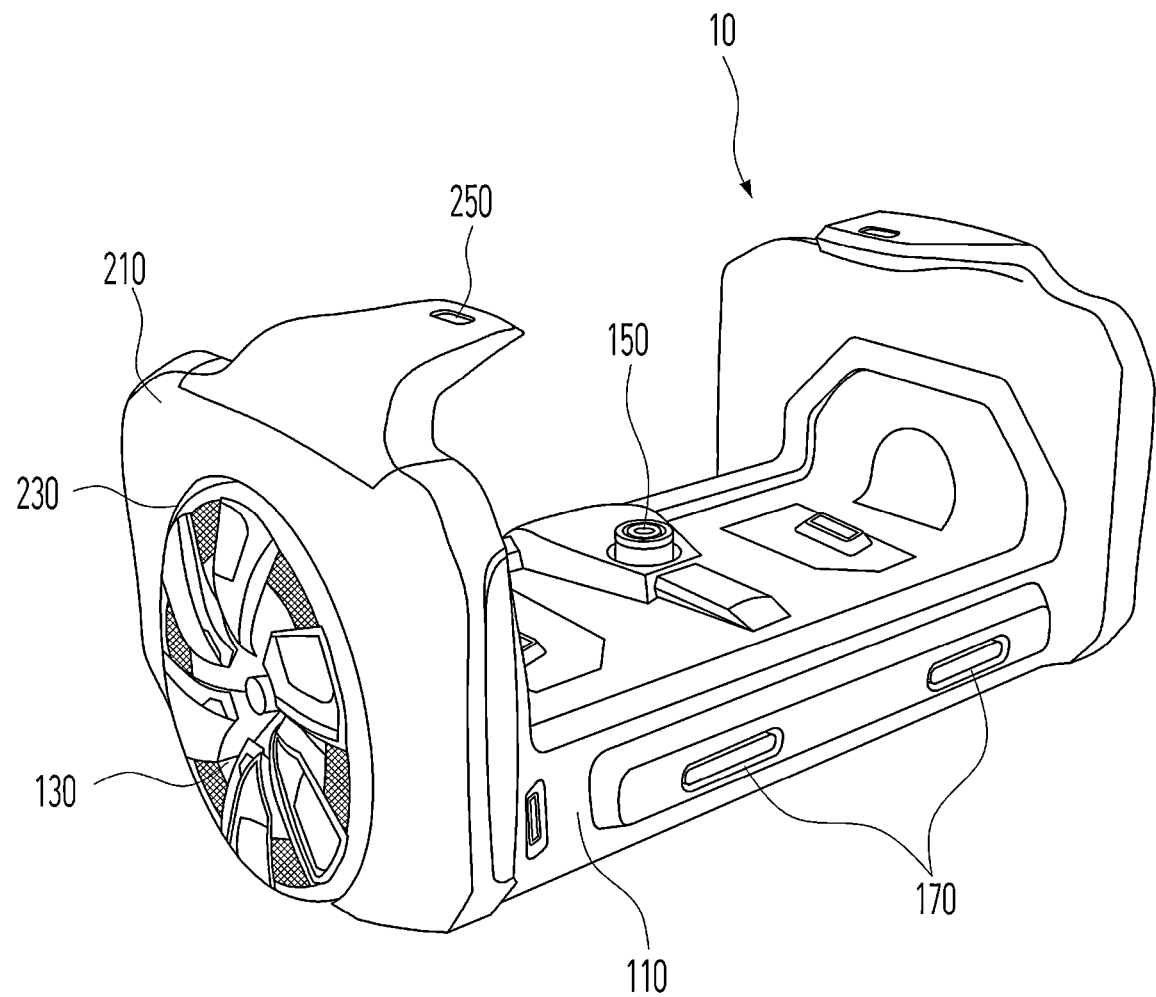
FIG. 1 is a view illustrating a modular driving apparatus according to an embodiment of the present invention.

Hereinafter, the present invention will be described in detail with reference to the accompanying drawings. However, embodiments of the present invention may be made in several different forms and are not limited to the embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included.

It will be further understood that the words or terms used in the present invention are used to describe specific embodiments of the present invention and there is no intent to limit the present invention. The singular form of the components may be understood into the plural form unless otherwise specifically stated in the context. It should be also understood that the terms of 'include' or 'have' in the specification are used to mean that there are characteristics, numbers, steps, operations, components, parts, or combinations of the steps, operations, components and parts described in the specification and there is no intent to exclude existence or possibility of other characteristics, numbers, steps, operations, components, parts, or combinations of the steps, operations, components and parts.

Hereinafter, embodiments of the invention will be described in detail with reference to the accompanying drawings.

FIG. 1 is a view illustrating a modular driving apparatus according to an embodiment of the present invention.

Figure 2A:
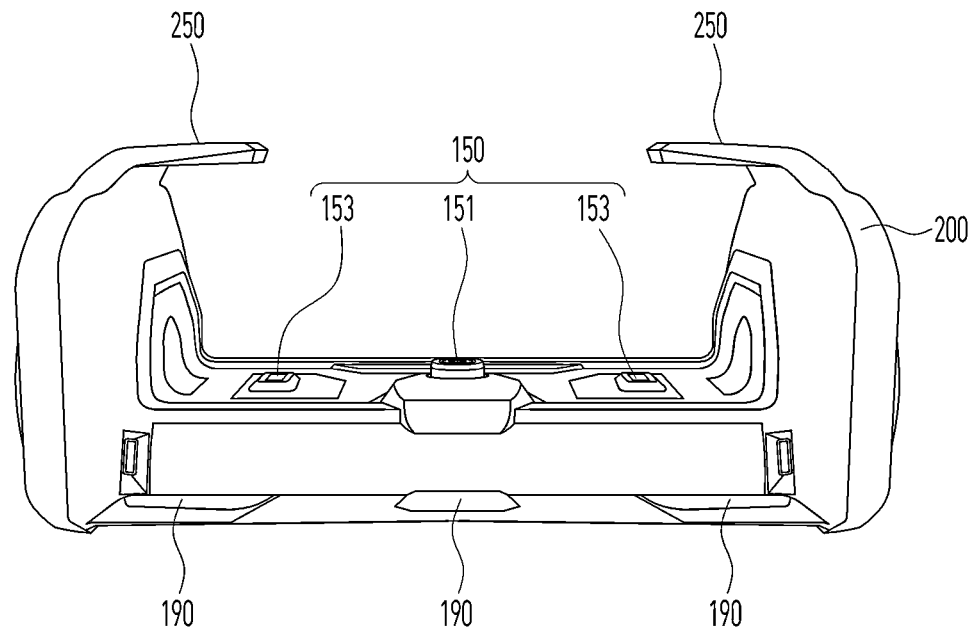
FIG. 2A is a front view and FIG. 2B is a rear view of the modular driving apparatus according to the embodiment of the present invention.
Figure 2B:
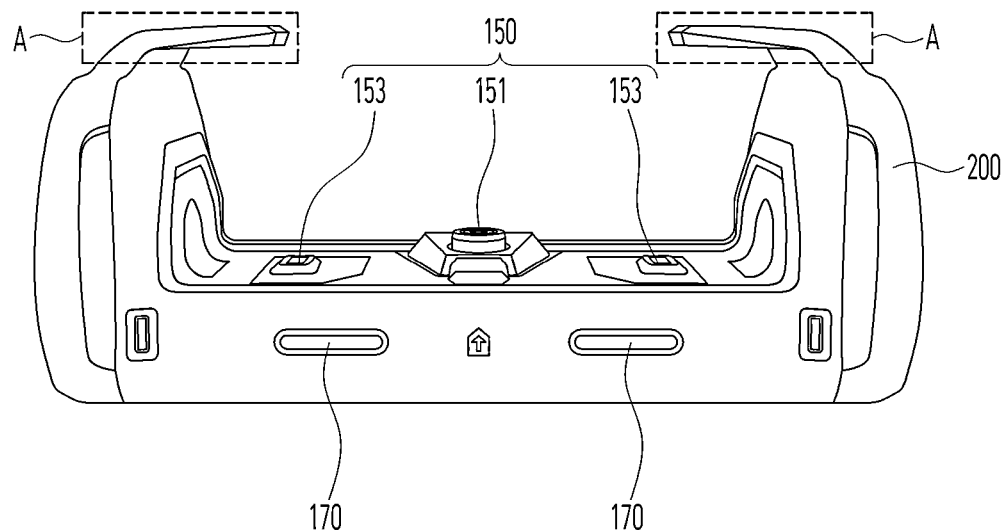

FIG. 2A is a front view and FIG. 2B is a rear view of the modular driving apparatus according to the embodiment of the present invention.

Referring to FIG. 1, the modular driving apparatus 10 according to the embodiment of the present invention includes a main body 100, and coupling guide blades 200.

The modular driving apparatus 10 according to the embodiment of the present invention is a device capable of being driven in combination with a ride module 300 having an interior space or being driven independently. The modular driving apparatus 10 can be combined with various ride modules of different types according to use purposes, and can be driven alone without being combined with the ride module.

Referring to FIG. 1, the main body 100 according to an embodiment of the present invention includes a main body frame 110, wheel modules 130, a connector module 150, a first coupling unit 170, and a second coupling unit 190.

As illustrated in FIG. 1, the main body 100 may be formed in a "E" shape so as to surround three surfaces of a portion of the ride module 300 so as to provide a coupling space in which the ride module 300 can be mounted.

The main body 100 surrounds both sides and one surface of the ride module 300 mounted in the coupling space, and the wheel modules 130 of the main body 100 can run with the ride module 300 mounted in the coupling space. In this instance, as described above, the wheel modules 130 can be driven even when the ride module 300 is not mounted in the coupling space.

As described above, the main body frame 110 according to the present embodiment can be formed in a "E" shape to provide the coupling space in which the ride module 300 can be mounted, and the upper parts of both sides can be formed to protrude inwards.

The wheel modules 130 can be formed on both sides of the main body frame 110. The wheel modules 130 of the present invention may be formed integrally with the main body frame 110, and in another embodiment, the wheel modules 130 may be detachably attached to the main body frame 110.

The coupling guide blades 200 of the present invention are attached to the outer surfaces of both sides of the main body frame 110. Accordingly, the coupling guide blades 200 should correspond to the shape of both sides of the main body frame 110.

In addition, the connector module 150 according to the present embodiment can be formed on the upper surface which provides the coupling space for mounting the ride module 300. More specifically, as illustrated in FIG. 1, the connector module 150 according to an embodiment of the present invention may be formed on the upper surface which meets the lower portion of the ride module 300.

According to an embodiment of the present invention, the connector module 150 is a module connected to a connector terminal (not shown) formed at the lower portion of the ride module 300. The connector module 150 can be connected to the connector terminal (of the ride module 300 to send and receive an operation signal and a control signal to and from the ride module 300, thereby performing an operation corresponding to the operation of any one component.

FIG. 2A is a front view of the modular drive device 10, and FIG. 2B is a rear view of the modular drive device 10.

Referring to FIG. 2B, a first coupling unit 170 may be formed on the rear surface of the main body frame 110, and a second coupling unit 190 may be formed on the front surface of the main body frame 110.

The first coupling unit 170 is formed on a first side which is different from both sides of the main body 100 in which the wheel module 130 is located, and is configured to be combined with another modular driving apparatus of the outside.

In more detail, the first coupling unit 170 may be made in the form of a plate inserted into a second coupling unit of another modular driving apparatus of the outside. Alternatively, the first coupling unit 170 is usually in the main body frame 110 as illustrated in FIGS. 1 and 2, but when being combined with another modular driving apparatus of the outside, may be inserted into a second coupling unit of the another modular driving apparatus from the main body frame 110.

Here, the first side may refer to one side on which the first coupling unit 170 is formed as illustrated in FIG. 2B which is the rear view of the main body 100.

The second coupling unit 190 is formed on the second side of the main body 100, which is a region different from the both sides on which the wheel modules 130 are located, and is configured to be combined with another modular driving apparatus of the outside.

The second coupling part 190 may be formed as a hole through which a fastening unit of another modular driving apparatus of the outside can be inserted, wherein the fastening unit may be a unit such as the first coupling unit 170.

In addition, the second side refers to the other side on which the second coupling part 190 is formed as illustrated in FIG. 2A which is the front view of the main body 100.

The first coupling unit 170 and the second coupling unit 190 may be means for coupling a plurality of modular driving apparatuses with each other, but may also serve as locking means to be fixed in a coupled state.

Figure 3:
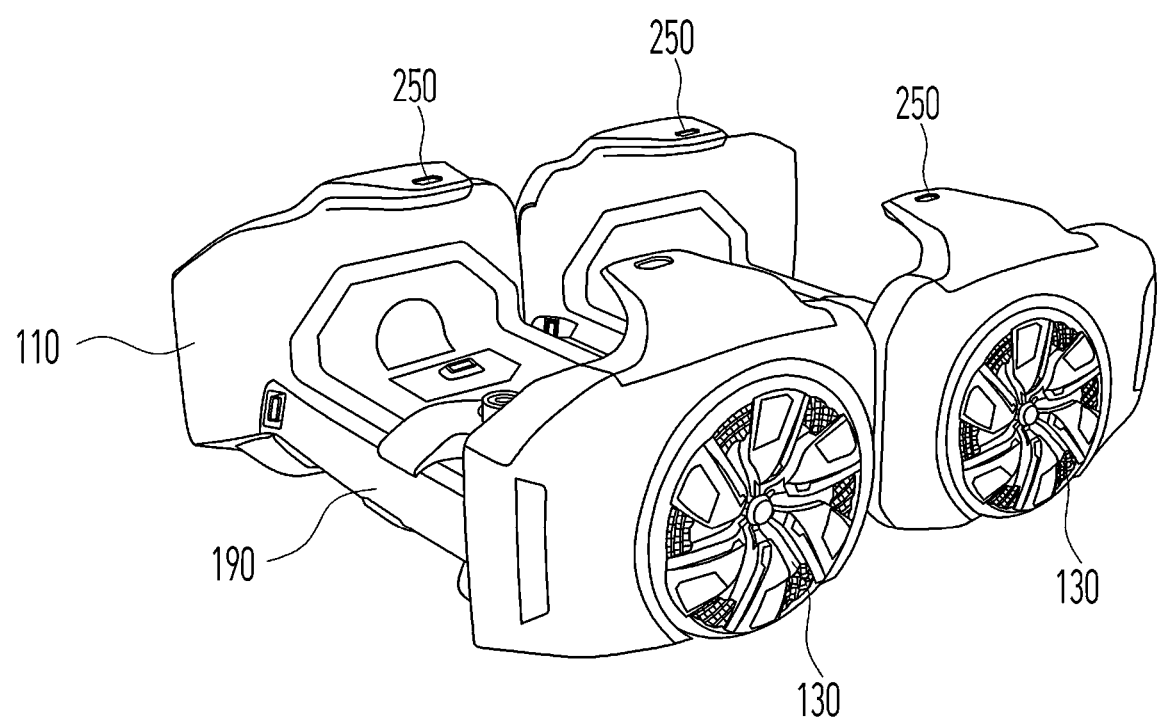
FIG. 3 is a view illustrating a combination of a plurality of modular driving apparatuses according to the embodiment of the present invention.

FIG. 3 is a view illustrating a combination of the plurality of modular driving apparatuses through the first coupling unit 170 and the second coupling unit 190 of each modular driving apparatus as described above.

Moreover, the wheel module 130 according to an embodiment of the present invention can be formed of an in-wheel motor type which includes at least one of a driving motor, a brake device, and a shock-absorbing device. For example, the wheel module 130 of the present invention can be formed as a non-pneumatic tire.

FIGS. 4A-4D are views illustrating an operational change for replacing a tread of a non-pneumatic type in-wheel module according to an embodiment of the present invention.

The wheel module 300 as illustrated in FIG. 4 according to an embodiment of the present invention includes a body 131, a wheel 133, a center cap 135, a tread 137, and a spoke 139.

Figure 4A:
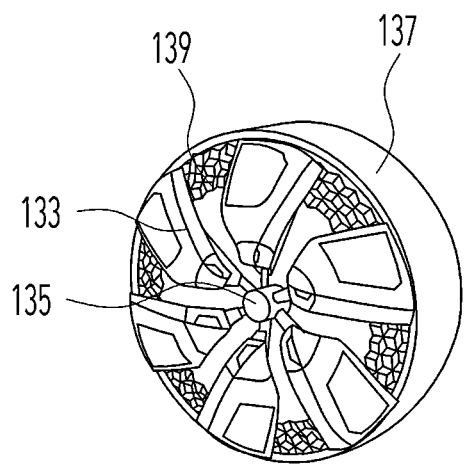
FIGS. 4A-4D are views illustrating an operational change for replacing a tread of a non-pneumatic type in-wheel module according to the embodiment of the present invention.
Figure 4B:
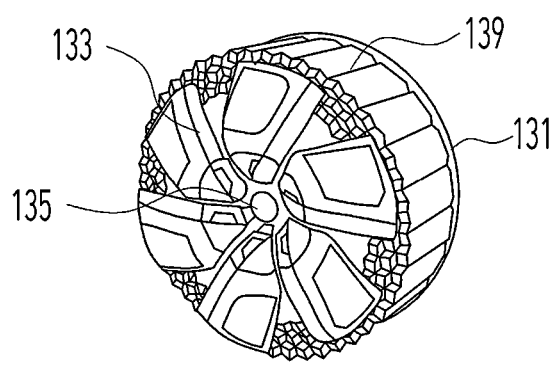
Figure 4C:
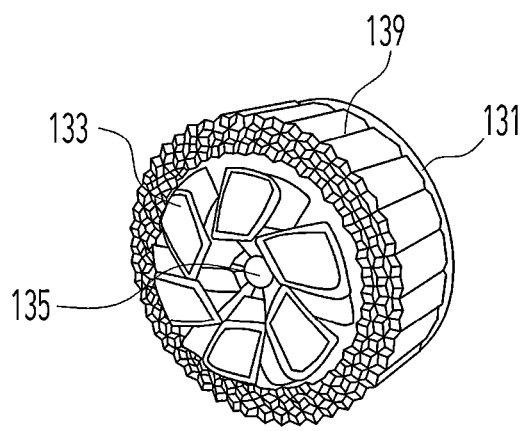
Figure 4D:
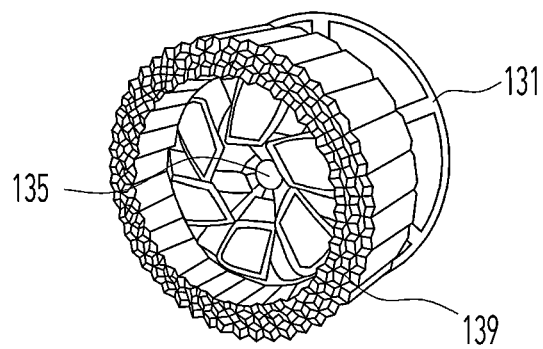

FIG. 4A illustrates an initial state of the non-pneumatic tire according to the present invention, FIG. 4B illustrates a non-pneumatic tire in an initial state without a tread 137, FIG. 4C illustrates a non-pneumatic tire according to a state where the center cap 135 is completely pressed, and FIG. 4D illustrates a state where the spoke 139 is separated in the state where the center cap 135 is completely pressed.

The wheel module 130 of the present invention does not require electrical power to move the plurality of wheels 133, and can be driven by an external physical force. However, in order to prevent opening and closing during driving, a spring (not shown) located inside the center cap 135 pushes the center cap 135 outwards and presses the center cap 135 only when it is necessary to replace the tread 137.

The wheel module 130 of the present invention as described above can be formed to slide only on the side without being separated in the traveling direction while the vehicle runs, and can allow disassembly of the tread 137. In more detail, a wheel 133 extending from the center cap 135 during normal operation prevents separation of the tread 137 by surrounding the side surface of the tread 137, and when the center cap 135 is pressed for replacement, all the wheels 133 are moved inward to form a space in which the tread 137 can be separated so that a non-pneumatic tire can be formed in such a way as to separate the tread 137 from the body 131.

The wheel module 130 of the present invention is eco-friendly and is a sustainable tire since only the tread 137 can be replaced without replacing the entire wheel module 130. Since the spoke structure acts as an air layer of an existing tire and does not require a side wheel of the existing tire, and thus the separated tread can be re-processed and can be recycled effectively, and raw materials required for processing can be significantly reduced. Furthermore, since the wheel module 130 according to the present invention is not pneumatic, the wheel module 130 does not require a separate air pressure measuring sensor. On the other hand, if a sensor for measuring temperature, acceleration, and tread depth is provided, the sensor can be attached to a portion grounded to the tread inside the spoke, and can improve the accuracy of a measurement data value by being positioned close to the road surface, and is easy to maintain and repair since being attached to the inside of the spoke structure.

Refer again to FIG. 1.

Each of the coupling guide blades 200 according to an embodiment of the present invention includes a coupling guide blade frame 210, a wheel module coupling hole 230, and a combination determining sensor 250.

The coupling guide blade frames 210 are formed in a shape matching the shape of both sides of the main body frame 110 to be attached to the outer surfaces of both sides of the main body frame 110.

According to this embodiment of the present invention, since the coupling guide blade frames 210 are respectively mounted on both sides of the main body frame 110, a plurality of coupling guide blade frames 210 can be provided.

Additionally, a wheel module coupling hole 230 may be formed in a region of the coupling guide blade frame 210 such that the outer surface of the wheel module 130 is exposed, as illustrated in FIG. 1.

While being mounted in the coupling space formed by the main body 100, the combination determining sensor 250 senses the position of the driving apparatus 10 with respect to the ride module 300 and determines combinability with the ride module 300 on the basis of the position information of the sensed driving apparatus 10.

For instance, the combination determination sensor 250 can determine combinability with the ride module 300 by sensing whether a portion of the coupling guide blade 200 is positioned at a predetermined reference position with respect to the ride module 300.

For example, the combination determination sensor 250 of the present invention may be a lidar sensor.

Figure 5:
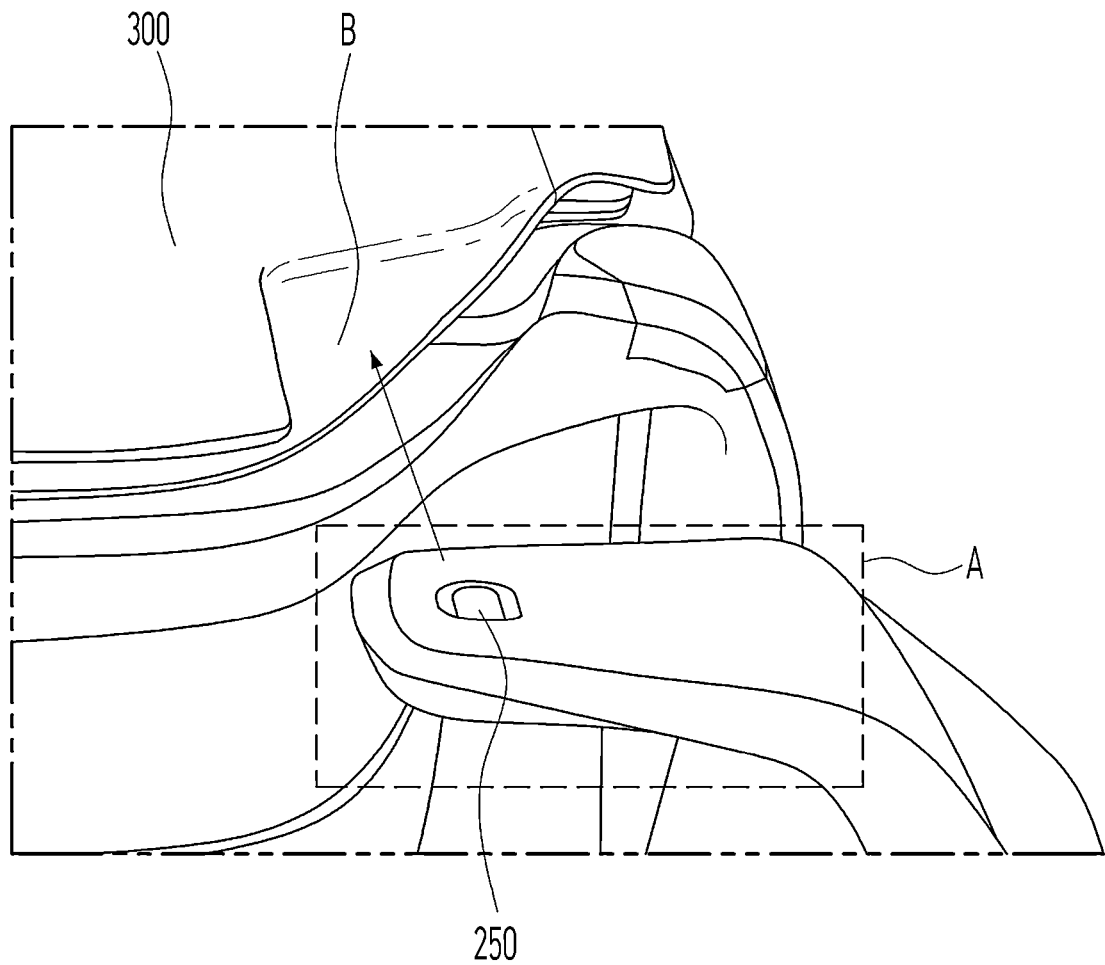
FIG. 5 is a view illustrating a process of coupling a coupling guide blade and an external ride module with each other according to the embodiment of the present invention.

FIG. 5 is a view illustrating a process in which a coupling guide blade and an external ride module are coupled with each other according to an embodiment of the present invention.

For example, as illustrated in FIG. 5, the ride module 300 compatible with the modular driving apparatus 10 of the present invention may have an area in which a part (A) of the coupling guide blade 200 can be disposed.

The coupling determining sensor 250 scans the surroundings during a combination with the ride module 300 and grasps the shape of the area of the ride module 300 already known, and then detects whether the current position corresponds to the reference position around the area or is located in a straight line with respect to the ride module 300.

Figure 6A:
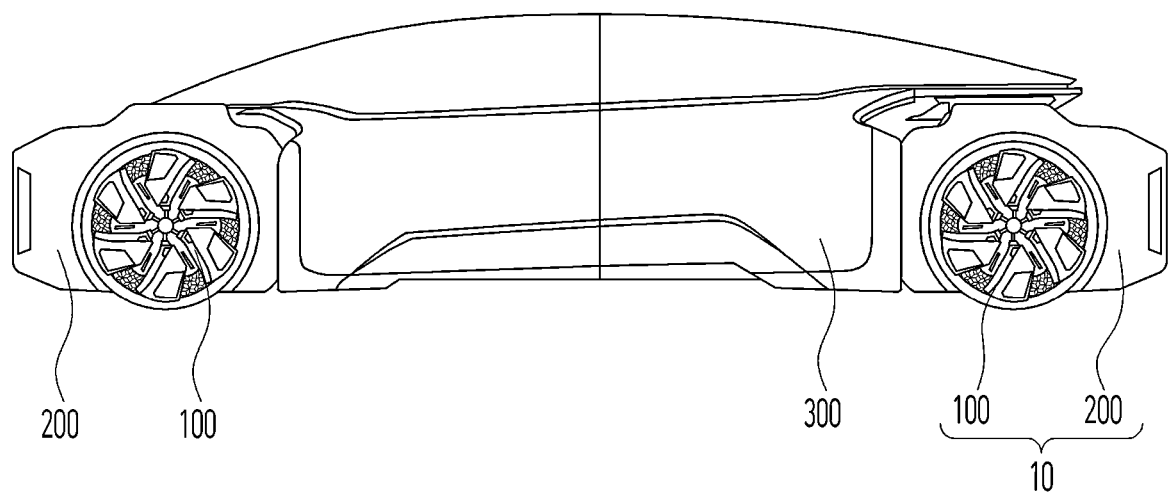
FIGS. 6A-6B are views illustrating a state in which a modular driving apparatus and various types of ride modules are coupled with each other according to the embodiment of the present invention.
Figure 6B:
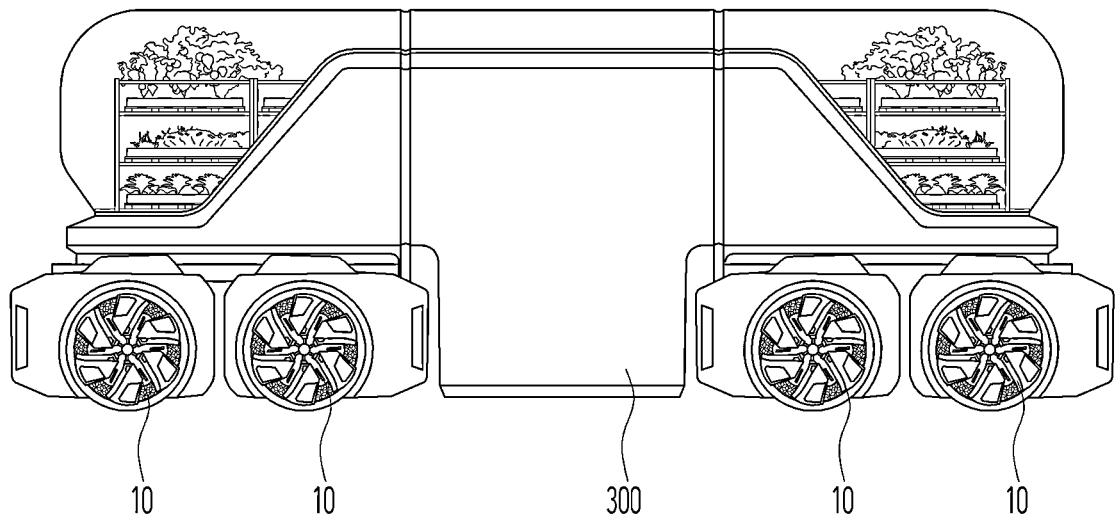

FIGS. 6A-6B are views illustrating a state in which a modular driving apparatus and various types of ride modules are coupled with each other according to the embodiment of the present invention.

The modular drive apparatus 10 according to an embodiment of the present invention can be combined with a ride module 300 as illustrated in FIG. 6A, or can be combined with another modular driving apparatus 10 of the outside, as illustrated in FIG. 6B.

As illustrated in FIG. 6B, the modular driving apparatus 10 of the present invention may be simultaneously combined with the ride module 300 and another modular driving apparatus of the outside.

According to another embodiment of the present invention, the modular driving apparatus 10 can share a self-battery thereof and a battery of the ride module 300.

Figure 7A:
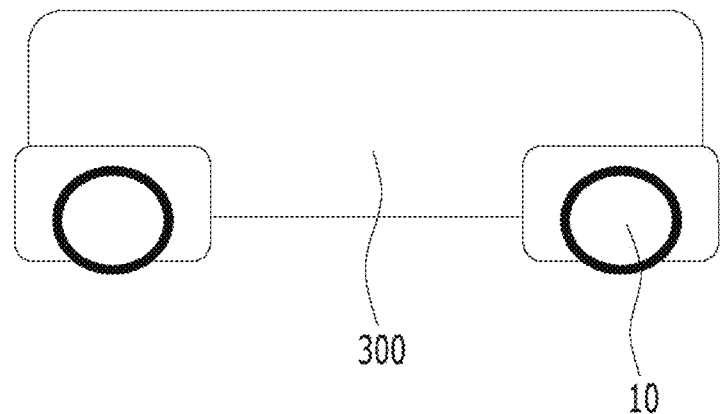
FIGS. 7A-7C are diagrams illustrating an effect of the modular driving apparatus according to the embodiment of the present invention.
Figure 7B:
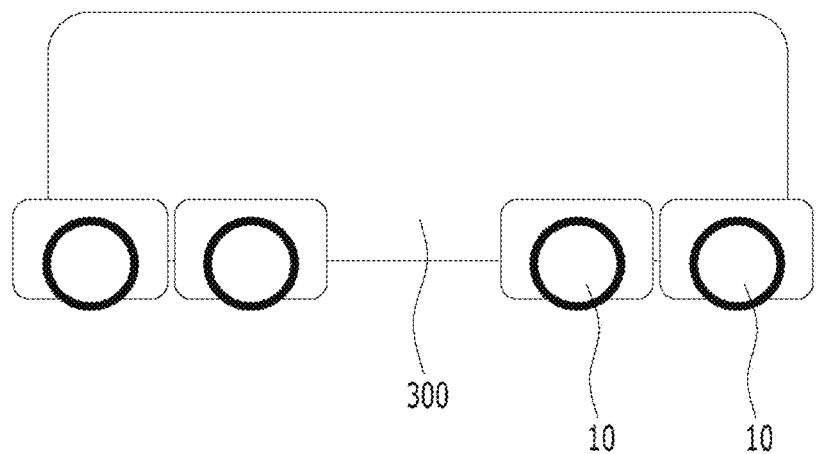
Figure 7C:
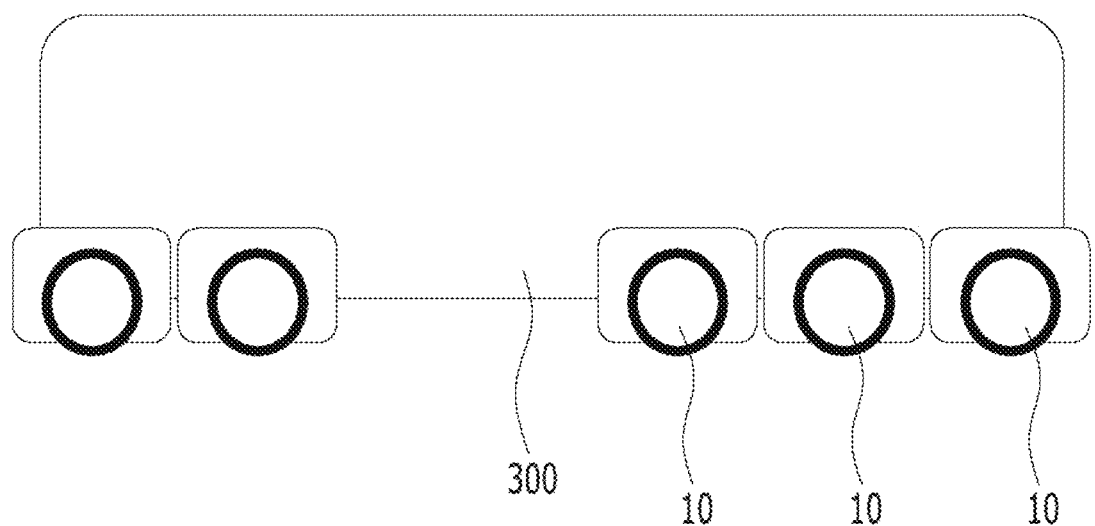

FIGS. 7A-7C are diagrams illustrating an effect of the modular driving apparatus according to the embodiment of the present invention.

Unlike a skate board type driving apparatus in which the wheel base is fixed, the modular driving apparatus 10 according to the present invention can be easily combined and separated according to the scale of the ride module (pod), thereby configuring mobility in 2×2, 4×4, or other combinations. Therefore, as illustrated in FIGS. 7A-7C, the ride module 300 can be expanded in size and reduced in restriction.

Figure 8A:
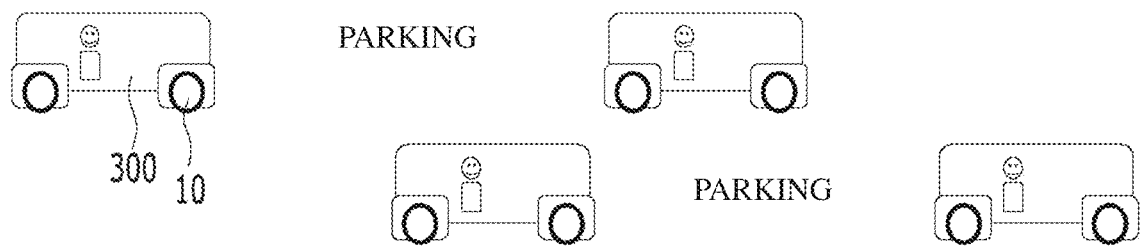
FIGS. 8A-8B are diagrams illustrating another effect of the modular driving apparatus according to the embodiment of the present invention.
Figure 8B:
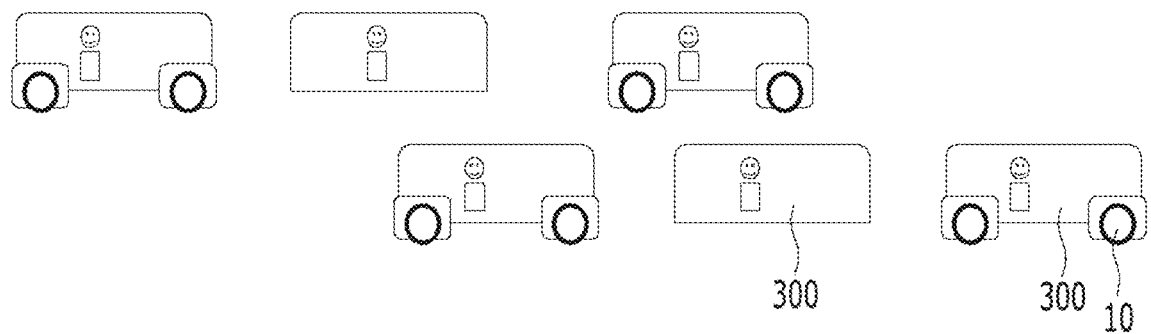

FIGS. 8A-8B are diagrams illustrating another effect of the modular driving apparatus according to the embodiment of the present invention.

The modular driving apparatus 10 according to the embodiment of the present invention can convert an unavailing space into an available space by separately and individually operating a space (ride module) and a driving system (modular driving apparatus), and in the same sense, can minimize the total amount of the driving system operated by systematizing the idle modular driving apparatus, which is not used during parking time, as a driving service.

In addition, since the tread of the modular driving apparatus 10 can be easily replaced in a replacement facility, a tire suitable for a predetermined driving environment can be automatically replaced based on data collected from the modular driving apparatus 10 and the wheel module (tire) without a user's involvement, and it is not necessary for a user to directly check a wear condition of a tire to replace the tire since the modular driving apparatus 10 is continuously managed by the infrastructure environment.

The above description is only exemplary, and it will be understood by those skilled in the art that the invention may be embodied in other concrete forms without changing the technological scope and essential features. Therefore, the above-described embodiments should be considered only as examples in all aspects and not for purposes of limitation. For example, each component described as a single type may be realized in a distributed manner, and similarly, components that are described as being distributed may be realized in a coupled manner.

The scope of the present invention is defined by the appended claims, and encompasses all modifications or alterations derived from meanings, the scope and equivalents of the appended claims.

What is claimed is:

1. A modular driving apparatus configured to be driven in combination with a ride module or be driven independently by being combined with or separated from the ride module, the modular driving apparatus comprising:
   a main body including a coupling space in which the ride module is mountable, and wheel modules which support both sides of the ride module when the ride module is mounted in the coupling space and operate to run together with the mounted ride module or operate to run autonomously; and
   coupling guide blades which are respectively fastened to both sides of the main body and include wheel module coupling holes for exposing outer surfaces of the wheel modules.

2. The modular driving apparatus according to claim 1, wherein each of the coupling guide blades further includes a combination determining sensor which is configured to determine combinability with the ride module by sensing a position of the driving apparatus with respect to the ride module while the ride module is mounted in the coupling space.

3. The modular driving apparatus according to claim 2, wherein the combination determining sensor is a lidar sensor.

4. The modular driving apparatus according to claim 2, wherein the combination determining sensor is configured to determine combinability with the ride module by sensing whether a portion of each of the coupling guide blades is positioned at a predetermined reference position with respect to the ride module.

5. The modular driving apparatus according to claim 1, wherein the modular driving apparatus is combined with the ride module or another modular driving apparatus of an outside, or is simultaneously combined with the ride module and another modular driving apparatus of the outside.

6. The modular driving apparatus according to claim 5, wherein the main body further includes:
   a first coupling unit formed on a first side, which is an area different from both sides in which the wheel modules are respectively located, and inserted into another modular driving apparatus of the outside so as to be combined with the another modular driving apparatus of the outside; and
   a second coupling unit formed on a second side, which is an area different from both sides in which the wheel modules are respectively located, and into which a coupling unit of another modular driving apparatus of the outside is inserted so that the main body is combined with the another modular driving apparatus of the outside.

7. The modular driving apparatus according to claim 1, wherein the main body further includes a connector module disposed on an upper surface thereof providing the coupling space in which the ride module is mounted for connection with the ride module.

8. The modular driving apparatus of claim 1, wherein each of the wheel modules comprises an in-wheel motor including at least one of a driving motor, a brake device, and a shock-absorbing device therein.

* * * * *